VARIABLE NEGATIVE IMPEDANCE CONVERTER CIRCUIT

Filed Jan. 27, 1960 2 Sheets-Sheet 1

Inventor
A. OUCHI
By C. H. Suydam
AGENT

Aug. 18, 1964 ATSUYOSHI OUCHI 3,145,335

VARIABLE NEGATIVE IMPEDANCE CONVERTER CIRCUIT

Filed Jan. 27, 1960 2 Sheets-Sheet 2

Inventor
A. OUCHI
By C. H. Suydam
AGENT

United States Patent Office 3,145,335

Patented Aug. 18, 1964

3,145,335

VARIABLE NEGATIVE IMPEDANCE CONVERTER CIRCUIT

Atsuyoshi Ouchi, Tokyo, Japan, assignor to Nippon Electric Company, Limited, Tokyo, Japan, a corporation of Japan Filed Jan. 27, 1960, Ser. No. 4,987
Claims priority, application Japan Feb. 18, 1959
2 Claims. (Cl. 323—74)

This invention relates to the dual control of variable impedances. In particular it relates to the simultaneous control of impedances by electronic means including only one control means.

The main object of the invention is to provide a circuit arrangement including a negative impedance converter and a single variable impedance element to control simultaneously a plurality of impedances.

The above-mentioned and other features and objects of this invention and the manner of attaining them will become more apparent and the invention itself will be best understood by reference to the following description of an embodiment of the invention taken in conjunction with the accompanying drawings, in which.

Figure 1:
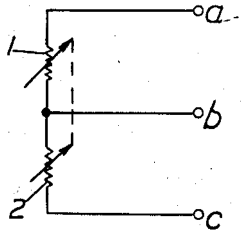
FIG. 1, FIG. 4, FIG. 6, FIG. 9 and FIG. 11 are well known circuit diagrams used in connection with the explanation of this invention.

As illustrated in FIG. 1, it is often necessary in an electric circuit to increase or decrease simultaneously, as by interlocked motion, the resistance values of two variable resistors 1 and 2. However, interlocked variable resistors are, in general, difficult to manufacture and are prone to malfunction. This invention provides a circuit which has the same effect as FIG. 1 by using a known negative impedance converter and a single variable resistor.

Figure 2:
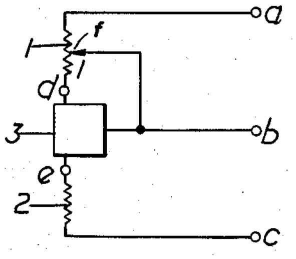
FIG. 2 and FIG. 3 are respectively a block circuit diagram to illustrate the principles of the invention and a schematic circuit diagram illustrating one example of the features of the invention.

FIG. 2 is a block circuit diagram showing principles of this invention. Reference character 1 refers to a variable resistor; 2 a fixed resistor, and 3 a negative impedance converter.

Terminals *a*, *b* and *c* correspond respectively to the terminals *a*, *b*, and *c* of FIG. 1 in which variable resistances appear between *a* and *b* and between *c* and *b*.

The negative impedance converter 3 is an unbalanced type with *b* as a common terminal, and *bd* and *eb* as input output terminals. Also the sliding brush of the variable resistor 1 is shown by *f*. Now, for convenience of explanation, taking the simplest and the most general case as an example, let the impedance-conversion factor K of the negative impedance converter remain −1 irrespective of the frequency. Also let the over-all resistance of the variable resistor 1 and the resistance of the fixed resistor 2 each be R, and let the resistance between the sliding brush *f* of the variable resistor 1 and the terminal *d* be *r*. In this case only *r* is variable. An explanation will now be made as to the value of resistances appearing between the terminals *a* and *b* and between *c* and *b*. To start with, it is obvious that the value of resistance appearing between *a* and *b* is the total resistance R, of 1, minus the resistance *r* between *d* and *f*, or $R-r$. The resistance between *b* and *c* consists of the resistance R, of the resistor 2, and the resistance of the negative impedance converter 3, viewed from *e*–*b*, connected in series. However, the negative impedance converter 3 has its one side, between *d* and *b*, shunted by the resistance *r* between *d* and *f*, and the resistance appearing between *e* and *b* becomes the negative resistance $-r$. Consequently, the resistance between *c* and *b* is the algebraic sum of R and $-r$, which is equal to the resistance between *a* and *b*. Thus, changing *r* from 0 to R by moving the sliding brush *f* changes $R-r$ from R to 0, and the resistances obtained between *a* and *b* and between *b* and *c* are exactly equal to the case in which two, variable resistors of FIG. 1, each having a total resistance of R, are moved interlocked.

It has been assumed in the foregoing explanation, for simplicity of explanation, that the negative impedance converter produces an impedance conversion factor K of −1 for any frequency. Since, however, the negative impedance converter consists of active elements such as vacuum tubes or transistors and passive elements such as resistors and capacitors, that the impedance-conversion factor has frequency characteristics is inevitable. Because the negative impedance converter has inherent frequency characteristics, the impedance-conversion factor is normally expressed by the complex number $K+jM$, wherein K denotes a negative real number, $jM$ a positive, negative or zero imaginary number; both being a function of the frequency. As is well known, the characteristics can be made to assume the value $K=-1$ and $jM=0$ for a certain restricted frequency range. $jM$ generally assumes a value other than zero in a higher frequency range, but $jM$ can easily be made zero in a lower frequency region, provided the negative impedance converter is designed with the same idea as for a D.C. amplifier. It goes without saying that, in this case, the characteristics of the negative impedance converter is easily affected by the effect of stability of the D.C. power supply circuit or the effect of dark currents where transistors are used as the active elements. To make $jM$ close to zero within a predetermined band at higher frequencies, vacuum tubes or transistors specifically designed for radio-frequency use should be used.

The negative impedance converter, according to this invention has such a frequency characteristic that there is no objection in considering that the impedance-conversion factor assumes a real number −1 in practice, provided that the applicable frequency band of the present circuit be suitably selected within the real frequency band.

Figure 3:
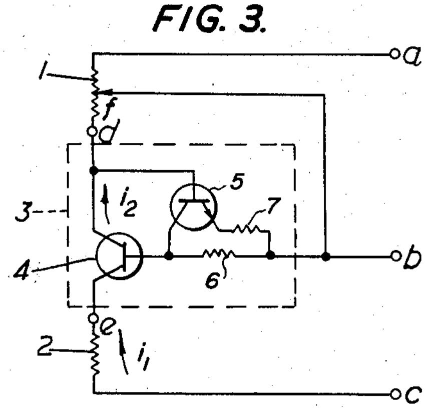

As shown in FIG. 2, this invention necessitates the use of only a single variable resistor 1 as a moving part. It is well known that, compared with the interlocking type variable resistors employed in FIG. 1, this kind of a single variable resistor has a simpler construction and a higher reliability, and even if the quality of the product were the same as that of FIG. 1, the fact that the mechanical contact part which is most liable to cause poor contact etc., is made a single unit, improves the reliability of the entire circuit, making the industrial advantages greater. However, although the indispensability in this invention of a negative impedance converter requiring active elements, is a disadvantage compared with the circuit in FIG. 1, the overall reliability of this invention is superior, because, using a negative impedance converter with the latest transistors, weight and volume are reduced, and the reliability of the transistor itself is generally higher than that of the mechanical contact. Furthermore, this invention requires D.C. source to operate the negative impedance converter, but in cases where this circuit is employed as a part of an equipment using vacuum tubes and transistors, it is obvious that this point is hardly a disadvantage. FIG. 3 illustrates the circuitry of FIG. 2 expanded to show a well known negative impedance circuit using two transistors. In the negative impedance converter circuit 3 in FIG. 3, the D.C. supply circuit to operate the transistors is omitted. The negative impedance converter 3 in FIG. 3 is of the unbalanced type having a common terminal *b*. Upon a current $i_1$ flowing into the emitter of transistor 4 from terminal *e*, a current $i_2$ flows out in the direction of terminal *d* from the collector of transistor 4, a voltage drop being produced across resistance *r* between terminals *d* and *f* by this current. In this case, the positive polarity is on the terminal *d* side. The voltage produced at terminal *d* is applied to the base of transistor 5. If the resistance values of resistors 6 and 7 are selected approximately equal to each other, a voltage the polarity of which is opposite to that of the voltage applied to the base of 5 appears at the collector of transistor 5 and further, this voltage is applied to the base of the transistor 4.

Since the voltage drop between the base and the emitter of a transistor is extremely small, the voltage applied to the base of the transistor 4 appears as it is at the emitter of the transistor 4. The polarity of the voltage produced at the emitter of the transistor 4 will be negative on account of the polarity inversion action possessed by the transistor 5. Because of the sense of the direction of the current flowing in the emitter of transistor 4 and the polarity of the voltage produced at the emitter of transistor 4, the impedance of the negative impedance converter connected between terminals *e* and *b* become negative.

The magnitudes of the resultant impedances will now be examined. Assuming that both the base currents and the base-emitter potential differences are negligible in each of the transistors (a generally reliable assumption), the voltage appearing across terminals *d* and *b*, due to the resistance *r*, causes transistor 5 to produce a directly proportional voltage across resistor 7. Inasmuch as the current magnitudes through resistors 6 and 7 are equal (the transistor base currents being, as noted, effectively zero) the voltages appearing across them will be in a ratio equal to that of their resistances. Since no appreciable voltage appears between the base and emitter of transistor 4 the voltage across resistor 6 appears between terminals *e* and *b*. Where resistors 6 and 7 are made equal the magnitude of this voltage is equivalent to that appearing between terminals *d* and *b* due to resistance *r*. Since now the effective impedance seen cross terminals *b* and *e* is represented by the voltage thereat divided by the current, and this current $i_1$ is equal to $i_2$ (the transistor base currents being negligible) the impedance magnitude is equal to *r* with the sign reversed. Consequently, both terminals *a* to *b* and *b* to *c* exhibit an impedance $R-r$. It may easily be seen that, when desired, by making either resistors 1 and 2 or 6 and 7 unequal the impedance equality between the impedance terminals may be eliminated.

The operation of the circuit in FIG. 3 as a variable impedance circuit is exactly the same as that of FIG. 2.

As to the negative impedance converter circuit, of course one with vacuum tubes can be used as well. Other various types can also be used for the negative impedance converter if one selects a suitable circuit and working frequency band to suit the purpose. The explanation hitherto made concerns itself with a case whose purpose was to obtain the same value between the terminals *a–b* and *c–b*, but if different values are required between *a–b* and *c–b*, the use of different value resistances for 1 and 2, and a suitable value other than $-1$ for the impedance-conversion factor K of the negative impedance converter may be made. Furthermore, in both FIG. 1 and FIG. 3, an unbalanced negative impedance converter having a common terminal *b* is employed. The reason for this is that the variable impedance circuit has the common terminal; but if two resistances on the output sides are used entirely independently, a balanced type may also be used as the negative impedance converter.

Next, explanations will be made for cases in which the circuit of this invention is especially effective.

Figure 4:
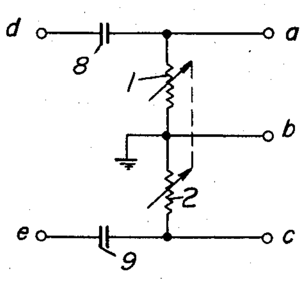
Figure 5:
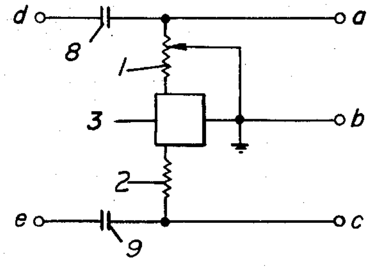
FIG. 5, FIG. 7, FIG. 8 and FIG. 10 are block circuit diagrams showing additional applications of the invention.

FIG. 4 illustrates a balanced type variable phase shifter with interconnected variable resistors 1 and 2, and condensers 8 and 9 for obtaining an output from the terminals *a–b* and *b–c* for an input to the terminals *d–e*, wherein the phase shift is adjusted by 1 and 2. FIG. 5 shows the circuit replaced by this invention.

Figure 6:
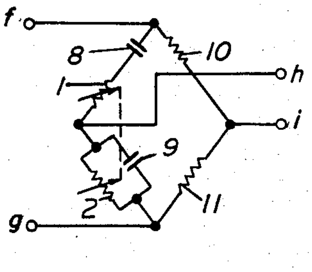
Figure 7:
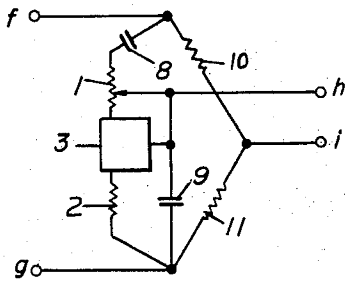

In FIG. 5, 3 indicates the negative impedance converter, and other notations correspond respectively to FIG. 4. In FIG. 4 and FIG. 5, if the condensers 8 and 9 are respectively replaced by resistors, the circuit of a balanced type variable resistance attenuator is obtained. FIG. 6 shows a so-called variable resistance type Wien bridge with input terminals *f* and *g*, output terminals *h* and *i*, interconnected variable resistors 1 and 2, condensers 8 and 9, and fixed resistors 10 and 11. In FIG. 7, the circuit of FIG. 6 is replaced by this invention, 3 indicating the negative impedance converters and other notations corresponding respectively to the same numbers of FIG. 6.

Selected frequency can be varied by simply moving the variable resistor 1.

Figure 8:
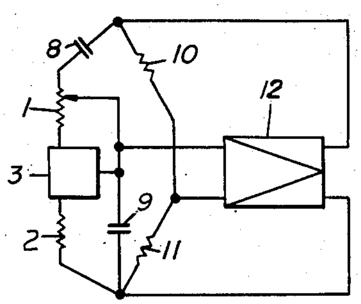

FIG. 8 is a block circuit diagram of a C.R. oscillator composed of an amplifier 12 added further to FIG. 7. Without changing the oscillation amplitude, the oscillation frequency can be changed by adjusting the resistor 1. This can be transformed into a frequency selective amplifier.

Figure 9:
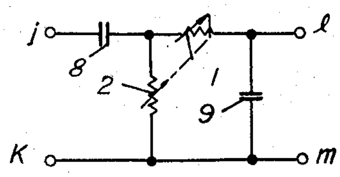

FIG. 9 shows a circuit in which two resistors 1 and 2, and two condensers 8 and 9 are used to make the phase shift zero between the input voltage applied across the terminals *j* and *k*, and the output voltage obtained across the terminals *l* and *m*, for a specific frequency. Inserting amplifiers between *jk* and *lm*, it is often used as a C.R. oscillator with that specific frequency as its oscillation frequency.

Figure 10:
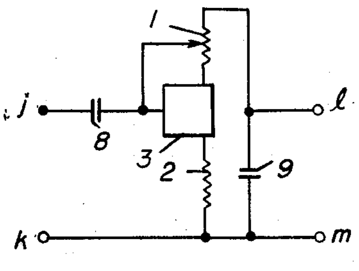

FIG. 9 requires the interconnected variable resistors 1 and 2 to change the zero phase shift frequency, but if this invention is applied as shown in FIG. 10, the variable resistor 1 alone is sufficient for a variable element. In FIG. 10, 3 is the negative impedance converter, and other notations respectively correspond to the same numbers in FIG. 9.

Figure 11:
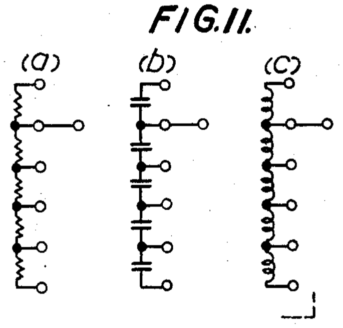

It is not always necessary to use the sliding type resistor for the variable resistor explained above, and a notch type whose circuit construction is shown in FIG. 11(*a*), or some other constructions may of course be used as well. It is also obvious that the variable element in this invention is not necessarily limited to resistance, but if required, for example, the variable capacity shown in FIG. 11(*b*), the variable inductance shown in FIG. 11(*c*), or their combination forming a general impedance variable system, may be applied under the same principle.

Furthermore, the expression, "a single variable resistor" has been used in explaining the variable impedance necessary to embody the features of this invention but the meaning of the words "a single" was generically deemed to include the case where "a single" is divided into several variable impedances such as two, fine and rough, to meet the practical requirement, or a case where it is combined with a fixed impedance or impedances for the purpose of specially limiting the variable range, or so on.

The meaning of "a single" for the fixed impedance part was similarly applied.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A circuit for simultaneously varying two impedances comprising: a negative impedance converter having a first and a second input-output port, and a third output port; a first impedance connected to said first port; a second impedance connected to said second port; and means for variably shunting said first impedance to said third port, whereby the second impedance and the shunted portion of the first impedance appear negatively at said third port and the unshunted portion of said first impedance appears without change at said third port.

2. A circuit as set forth in claim 1 in which the first and second impedances are serially connected respectively to said first and second ports and wherein the means for variably shunting said first impedance to said third port includes a slideable contact terminal for said first impedance, the position of said contact simultaneously controlling the value of the impedance appearing negatively at said third port and the value of said unchanged impedance at said third port.

References Cited in the file of this patent

UNITED STATES PATENTS

| | | |
|---|---|---|
| 2,777,115 | Linvill | Jan. 8, 1957 |